United States Patent
Puranik et al.

(10) Patent No.: US 10,683,722 B2
(45) Date of Patent: Jun. 16, 2020

(54) REPLACEABLE SEAT SEAL ASSEMBLY

(71) Applicant: Worldwide Oilfield Machine, Inc., Houston, TX (US)

(72) Inventors: Sudhir Shrivallabh Puranik, Houston, TX (US); Mansing Mohan Phase, Houston, TX (US); Kauntey Suresh Angal, Houston, TX (US)

( * ) Notice: Subject to any disclaimer, the term of this patent is extended or adjusted under 35 U.S.C. 154(b) by 97 days.

(21) Appl. No.: 15/909,307

(22) Filed: Mar. 1, 2018

(65) Prior Publication Data

US 2019/0271206 A1 Sep. 5, 2019

(51) Int. Cl.
*E21B 33/06* (2006.01)
*F16K 1/46* (2006.01)
*F16K 1/42* (2006.01)
*B23C 3/05* (2006.01)

(52) U.S. Cl.
CPC ............ *E21B 33/062* (2013.01); *F16K 1/422* (2013.01); *F16K 1/46* (2013.01); *B23C 3/051* (2013.01)

(58) Field of Classification Search
CPC ........ E21B 33/062; E21B 33/06; F16K 1/422; F16K 1/46
See application file for complete search history.

(56) References Cited

U.S. PATENT DOCUMENTS

| 1,908,221 | A | | 5/1933 | Church |
| 2,760,751 | A | | 8/1956 | Wilde |
| 4,444,404 | A | | 4/1984 | Parks, Jr. |
| 5,064,164 | A | * | 11/1991 | Le ..................... E21B 33/062 |
| | | | | 251/1.1 |
| 10,161,212 | B2 | * | 12/2018 | Araujo et al. ........ E21B 33/062 |
| 2017/0167219 | A1 | * | 6/2017 | Wang et al. .......... E21B 33/062 |

OTHER PUBLICATIONS

PCT International Search Report for PCT/US/2018/065147 dated Apr. 4, 2019.

* cited by examiner

*Primary Examiner* — Kevin L Lee
(74) *Attorney, Agent, or Firm* — Kenneth L. Nash; Thomas D. Nash (57) ABSTRACT

A replaceable seat seal assembly is used to form a replaceable portion of the ram cavity in a BOP that allows the central portion of the ram cavity to be replaced when wear occurs. A method is provided to refurbish a BOP that has a worn ram cavity with a replaceable portion of the ram cavity. The replaceable seat seal assembly includes a plurality of inserts such as a top insert, bottom insert, and two side inserts. The inserts of the replaceable seat seal assembly are positioned within one or more pockets or recesses machined into the ram cavity and throughbore. The inserts can be readily replaced for convenient maintenance without the need for heat treatments, welding, and the like that is normally needed to repair a used ram cavity.

30 Claims, 10 Drawing Sheets

REPLACEABLE SEAT SEAL ASSEMBLY

BACKGROUND OF THE INVENTION

Field of the Invention

The present invention relates generally to used blowout preventers that must be repaired and refurbished and more particularly to a replaceable seat seal assembly that may be used instead of the prolonged process of repair of BOP bodies.

Background of the Invention

A blowout preventer (BOP) is a large, specialized valve or similar mechanical device, used to seal, control and monitor oil and gas wells to prevent blowouts, the uncontrolled release of crude oil and/or natural gas from a well. They are usually installed redundantly in stacks.

The original ram BOPs of the 1920s were simple and rugged manual devices with minimal parts. The BOP housing (body) had a vertical well bore and a horizontal ram cavity (ram guide chamber). Opposing rams (plungers) in the ram cavity translated horizontally to overcome downhole pressures and seal the wellbore annulus.

Because BOPs are depended on for safety and reliability, efforts to minimize the complexity of the devices are still employed to ensure longevity. As a result, despite the ever-increasing demands placed on them, state of the art ram BOPs are conceptually the same as the first effective models, and resemble those units in many ways, e.g., the ram cavity and throughbore.

At the end of the lifetime of a blowout preventer, numerous problems may exist in the body of the BOP, which prevent the rams from sealing within the BOP body.

An extensive and prolonged process of Machining, Welding, Pre and Post Heat Treatment is required for successful repair and refurbishment of the used U type or Universal type Ram BOP. To refurbish a BOP body requires a lengthy process of almost 45 days of machining, welding, pre and post heat treatment to bring the body back to operative condition excluding the time consumed in transportation. Also, there is high chance of crack development if the procedure is not followed properly, directly affecting the performance of refurbished BOP.

Accordingly, those of skill in the art will appreciate the present invention which allows skipping the entire prolonged repair and refurbishing process while ensuring even higher performance level of the equipment.

SUMMARY OF THE INVENTION

One object of the present invention is to provide an improved ram cavity for a BOP.

Another object of the present invention is to create a replaceable ram cavity within a BOP.

Another object of the present invention is to provide a ram cavity with inserts that can be replaced after they wear.

Another object of the present invention is to avoid the entire prolonged process of welds and heat treatments to refurbish the ram cavity of a BOP.

Another object of the present invention is to provide a less expensive and reliable way to refurbish a BOP after it is worn and the rams do not seal within the BOP.

One general aspect includes a replaceable seat seal assembly for a BOP including a BOP body that defines a throughbore and a ram cavity that intersects the throughbore. In one embodiment, the used BOP which leaks through the BOP between the throughbore and ram cavity is machined to form a pocket near the intersection of the throughbore and ram cavity before the replaceable seat seals are inserted into the pocket. This forms a new seal that is good as or better than the original seal for the rams, with the same tolerances. However, the invention could also be used as part of a new BOP to provide replaceable seat seals that can be readily replaced in the field.

Accordingly, at least one pocket is defined within the throughbore and the ram cavity. The replaceable seat seal assembly also includes a first insert that fits into at least one pocket. The first insert forms an upper surface of a replaceable portion of the ram cavity for the BOP body when the BOP body is oriented for operation. A first neck fits into at least one pocket with the first insert extending into the throughbore. Generally the first neck is monolithic or monolithically formed or one-piece as part of the first insert to avoid the need for seals between the first neck and the insert.

Implementations may include one or more of the following features wherein the replaceable seat seal assembly further includes a second insert that forms a lower surface of the replaceable portion of the ram cavity. A second neck for the second insert extends into the throughbore. This component is also preferably monolithically formed as part of the second insert. The replaceable seat seal assembly may also include at least one pocket receiving the second insert and the second neck. The replaceable seat seal assembly may further include two side inserts that form side surfaces of the replaceable portion of the ram cavity and fit between the first insert and the second insert. The replaceable seat seal assembly may further include fasteners that mount the first neck of the first insert in the throughbore. The first neck may include a seal ring. The first insert further may include a seal ring on an upper surface of the first insert that seals with the ram cavity.

The ram cavity may have a worn portion. At least one pocket may be machined into the worn portion of the ram cavity and the throughbore. The first insert and the second insert may comprise a non-metallic material. The replaceable seat seal assembly further may comprise the first insert, the second insert, and the side inserts are constructed as one unit to form an interior surface of the replaceable portion of the ram cavity. The first insert and the second insert may form an interior surface of the replaceable portion of the ram cavity. Two side inserts may form additional surfaces of the replaceable portion of the ram cavity and fit between the first insert and the second insert. A first neck for the first insert extends into the throughbore and a second neck for the second insert extends into the throughbore. The first insert, the second insert, and the two side inserts form a circumference of the replaceable portion of the ram cavity. The BOP may further include a pocket formed within the BOP to receive the first insert, the second insert, the two side inserts, the first neck, and the second neck.

The ram cavity may have a worn portion, the pocket being machined into the worn portion of the ram cavity and/or the throughbore. Generally the area of concern is wear adjacent to the throughbore in the ram cavity that causes leaks between the throughbore and ram cavity between the rams and the body of the BOP. The method further includes providing seal rings on the one or more replaceable seat seals. The method further includes inserting a first insert that forms an upper surface of the replaceable portion of the original ram cavity for the BOP when the BOP is oriented for operation. The method may further include inserting a second insert that forms a lower surface of the replaceable portion of the original ram cavity for the BOP when the BOP is oriented for operation. Two side inserts may be inserted that form side surfaces of the replaceable portion of the ram cavity and fit between the first insert and the second insert.

One general aspect includes a replaceable seat seal assembly for a BOP includes a BOP body that defines a throughbore and ram cavity that intersects the throughbore. A first insert may be centrally positioned in the BOP around the throughbore that forms a first surface of a replaceable portion of the ram cavity for the BOP body, and a second insert centrally positioned in the BOP around the throughbore that forms a second surface of the replaceable portion of the ram cavity.

Implementations may include one or more of the following features wherein the replaceable seat seal assembly further includes two side inserts that form additional surfaces of the replaceable portion of the ram cavity and fit between the first insert and the second insert. A first neck for the first insert may extend into the throughbore and a second neck for the second insert may extend into the throughbore. The first insert, the second insert, and the two side inserts form a circumference of the replaceable portion of the ram cavity. A pocket may be formed within the BOP to receive the first insert, the second insert, the two side inserts, the first neck, and the second neck. The ram cavity may have a worn portion, the pocket being machined into the worn portion of the ram cavity and the throughbore. The method may further include providing seal rings on one or more replaceable seat seals. The method further including inserting a first insert into the BOP body that forms an upper surface of the replaceable portion of the original ram cavity for the BOP when the BOP is oriented for operation. A second insert forms a lower surface of the replaceable portion of the original ram cavity for the BOP when the BOP is oriented for operation. Two side inserts may be inserted to form side surfaces of the replaceable portion of the ram cavity and fit between the first insert and the second insert.

One general aspect includes a method for refurbishing a BOP. The BOP includes a throughbore and an original ram cavity that intersects the throughbore. The original ram cavity may be worn. The method including the steps of machining one or more pockets within the throughbore and the original ram cavity and inserting one or more replaceable seat seals into the one or more pockets to form a replaceable portion of the original ram cavity.

Implementations may include one or more of the following features wherein seal rings may be provided on one or more replaceable seat seals. The method further including inserting a first insert that forms an upper surface of the replaceable portion of the original ram cavity for the BOP when the BOP is oriented for operation. A second insert may be inserted that forms a lower surface of the replaceable portion of the original ram cavity for the BOP when the BOP is oriented for operation. Two side inserts may be inserted that form side surfaces of the replaceable portion of the ram cavity and fit between the first insert and the second insert.

BRIEF DESCRIPTION OF THE DRAWINGS

The above general description and the following detailed description are merely illustrative of the generic invention. Additional modes, advantages, and particulars of this invention will be readily suggested to those skilled in the art without departing from the spirit and scope of the invention. A more complete understanding of the invention and many of the attendant advantages thereto will be readily appreciated by reference to the following detailed description when considered in conjunction with the accompanying drawings, wherein like reference numerals refer to like parts and wherein.

DETAILED DESCRIPTION OF THE INVENTION

Detailed descriptions of an embodiment of the invention are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
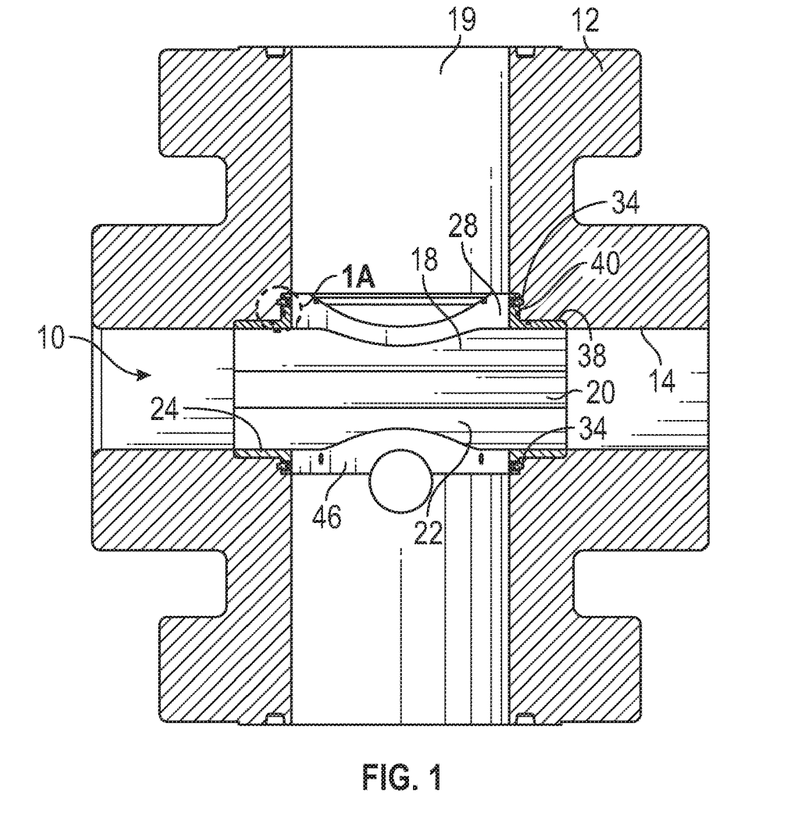
FIG. 1 is an elevational view in section showing a replaceable seat seal assembly installed within a BOP in a recess in the ram cavity and throughbore in accord with one embodiment of the present invention.

FIG. 1 shows replaceable seat seal assembly 10 mounted within BOP (blowout preventer) 12. BOP 12 could be any type of BOP. The replaceable seat seal assembly is used in BOPs that are damaged so that the rams no longer seal with original ram cavity 14. See for example FIG. 12 that includes damage to the original ram cavity at 54 and 56. The damage of concern may typically be worn areas such as 54 and 56 in the ram cavity 14 that prevent adequate sealing between the BOP between rams (see for example rams 50 in a refurbished BOP) and the BOP body. Accordingly leakage occurs between the throughbore and ram cavity past the rams. Rather than reworking the metal of the original ram cavity 14 as is done in the prior art, the original or worn ram cavity 14 and throughbore 19 are machined to form pocket 36 (see FIGS. 5 and 7) to accept replaceable seat seal assembly 10. Pocket 36 is a recess formed in a portion of original ram cavity 14 adjacent to throughbore 19. Pocket 36 may also include a recess in the throughbore 19 adjacent to the ram cavity 14.

While the replaceable seat seal assembly 10 can be used to repair a used BOP, in another embodiment, the replaceable seat seal assembly 10 is mounted in a new BOP so that the advantages of the replaceable seat seal assembly are immediately available. For example, BOPs with the replaceable seal assembly can be refurbished even at the rig site by replacement of the seal assembly.

Referring again to FIG. 1, replaceable seat seal assembly 10 in this embodiment comprises top insert 18, two side inserts 20 and bottom insert 22. The replaceable seat seal assembly encircles ram cavity 14 and creates a new portion of the ram cavity that may be referred to as replaceable portion 24 of ram cavity 14, inserted portion, or an insert ram cavity or the like. The top insert 18, two side inserts 20, and bottom insert 22 forms the inner sides of replaceable portion 24 of ram cavity 14. Accordingly, the replaceable portion 24 of the ram cavity effectively forms a new or like new ram cavity or ram guide chamber that contains the rams with the same or similar tolerances to a new ram cavity. Like the old ram cavity, the inserted ram cavity 14 is horizontal when the BOP is oriented for operation and throughbore 19 is vertical. The replaceable portion 24 of the ram cavity forms an interior surface 38 of replaceable seat seal assembly 10 that seals with the rams (see FIG. 11) and provides an inserted ram cavity that can be readily replaced even in the field without the need for extensive reworking of the ram body as in the prior art. The depth of pocket 36 that is machined into BOP 12 and thickness of the inserts that form inserted ram cavity 24 are preferably selected to result in the same internal dimensions of the original ram cavity. Accordingly, the same size rams can then be used in a BOP that utilizes the replaceable seat seal assembly. The replaceable portion 24 of the ram cavity may preferably provide the same internal dimensions for the rams and replaces the ram cavity defined by the body of the BOP that has been used since 1920.

Bottom inserts 22 and side Inserts 20 perform a supporting role for the top insert 18. The bottom insert 22 may be mounted in place using a grub screw or other suitable fastener 34 (see e.g., FIG. 34). The four section replaceable seat seal assembly 10 is designed to form the inserted ram cavity shape and would receive the same size rams as was the case prior to refurbishing the rams. In one embodiment, the replaceable seat seal assembly is used once pressure testing determines that the rams no longer adequately seal with the interior metal surface of the original ram cavity 14 of BOP 12. However, as also discussed above, the replaceable seat seal assembly could be used in new manufactured BOPs.

Figure 2:
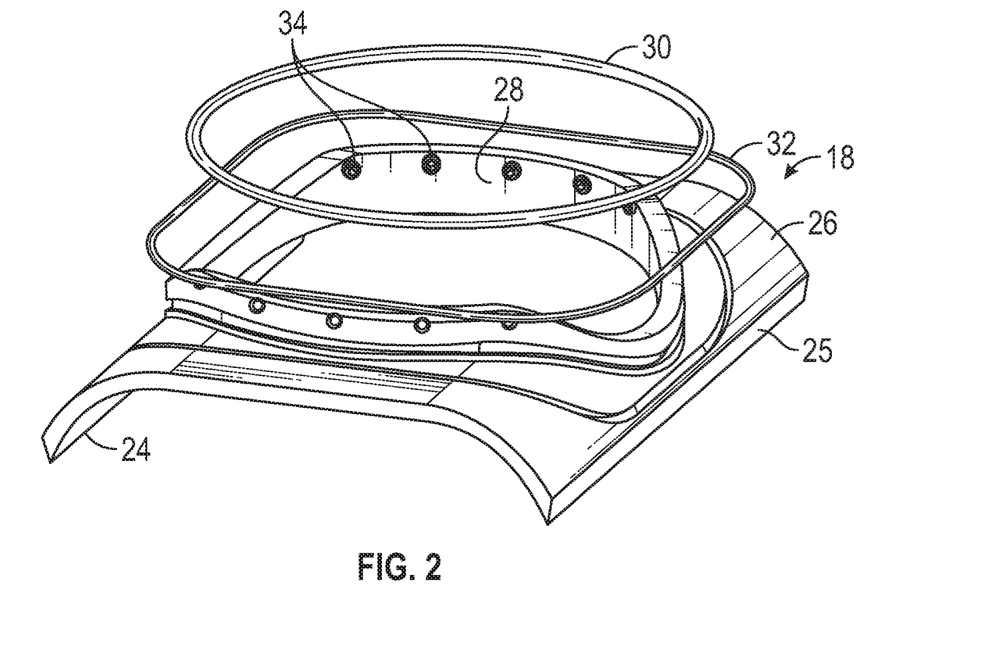
FIG. 2 is a perspective view prior to installation showing a top insert with O-rings not yet installed in accord with one embodiment of the present invention.
Figure 3:
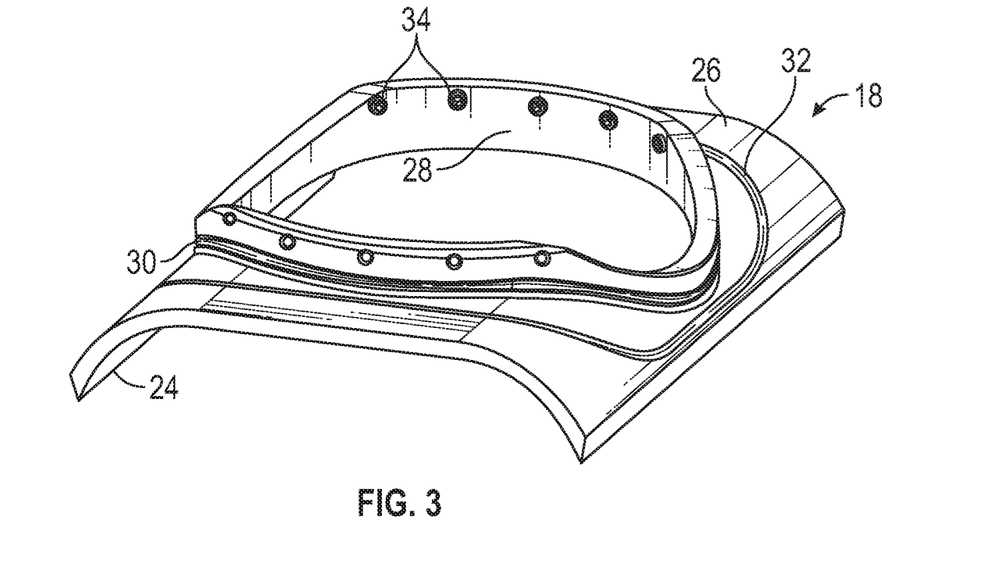
FIG. 3 is a perspective view of FIG. 2 with the O-rings and fasteners in position in accord with one embodiment of the invention.

Top insert 18 is shown in more detail in the perspective views of FIG. 2 and FIG. 3. Top insert 18 comprises a body 25 with an upper surface 26 that engages the machined cavity surface 38 of pocket 36 (See FIG. 5). Pocket 36 is machined within the original BOP 12. Seal 32 seals with the surface of pocket 36. As compared with FIG. 1, bottom insert 22 and side inserts 20 are removed showing pocket 36 machined within ram cavity 14.

Referring again to FIGS. 2 and 3, upper surface 26 is curved or otherwise shaped to fit within pocket 36. The underside of top insert 18 forms the upper surface of replaceable or inserted ram cavity 24.

Top insert neck 28 extends upwardly from upper surface 26 and is sized to fit within the machined pocket or recess formed in throughbore 19. Top insert neck 28 may also be referred to herein as a top neck, first neck, or the like. Top insert neck 28 and insert body 25 are preferably molded as a one piece item that includes grooves for the O-rings as shown in FIG. 2 and FIG. 3. Neck seal 30, which may comprise an O-ring or any other suitable seal ring, is utilized to seal within throughbore 19 of BOP 12. See FIG. 1A where neck seal 30 engages machined surface 40 within throughbore 19 of BOP 12. In this way, top insert neck 28 and top insert 18 seal between the throughbore 19 and ram cavity 14. This prevents leakage between the throughbore 19 and ram cavity 14 between top insert 18 and the BOP 12. The rams 50 then seal with the interior surface 24 of the replaceable seat seal assembly to repair the leaks that otherwise occurred between the rams and the damaged BOP ram cavity 14. Cavity seal ring 32 is positioned on upper surface 26 and engages the machined cavity surface 38 within BOP 12 as shown in FIG. 1 and in detail in FIG. 1A. These seals prevent leakage behind top insert 18 between ram cavity 14 and throughbore 19. Surfaces 38 and 40 are part of the pocket 36 shown in FIGS. 5 and 7 where not all the inserts are installed.

Figure 1A:
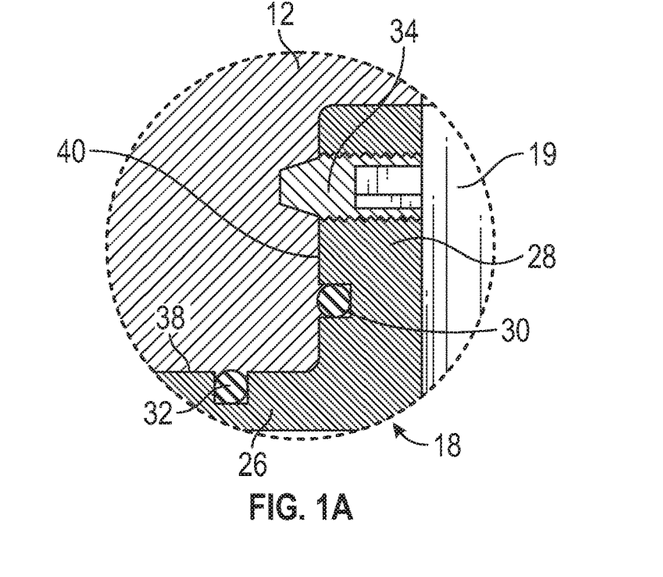
FIG. 1A is an enlarged view from FIG. 1 showing details of the replaceable seat seal assembly in accord with one embodiment of the present invention.

Fasteners 34, shown in FIGS. 2 and 3, which may be grub screws or the like, are used to secure top insert neck 28 within their dedicated position in throughbore 19 as shown in detail in FIG. 1A.

Figure 4:
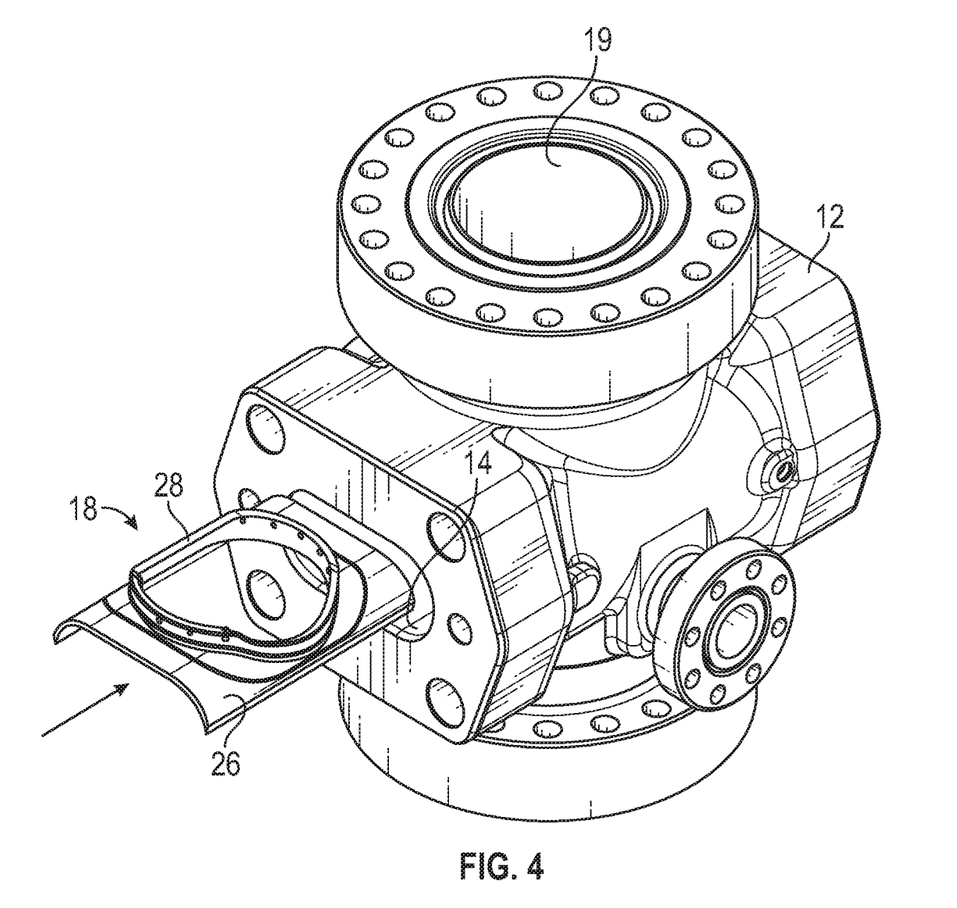
FIG. 4 is a perspective view showing the top insert being introduced into the BOP in accord with one embodiment of the invention.
Figure 5:
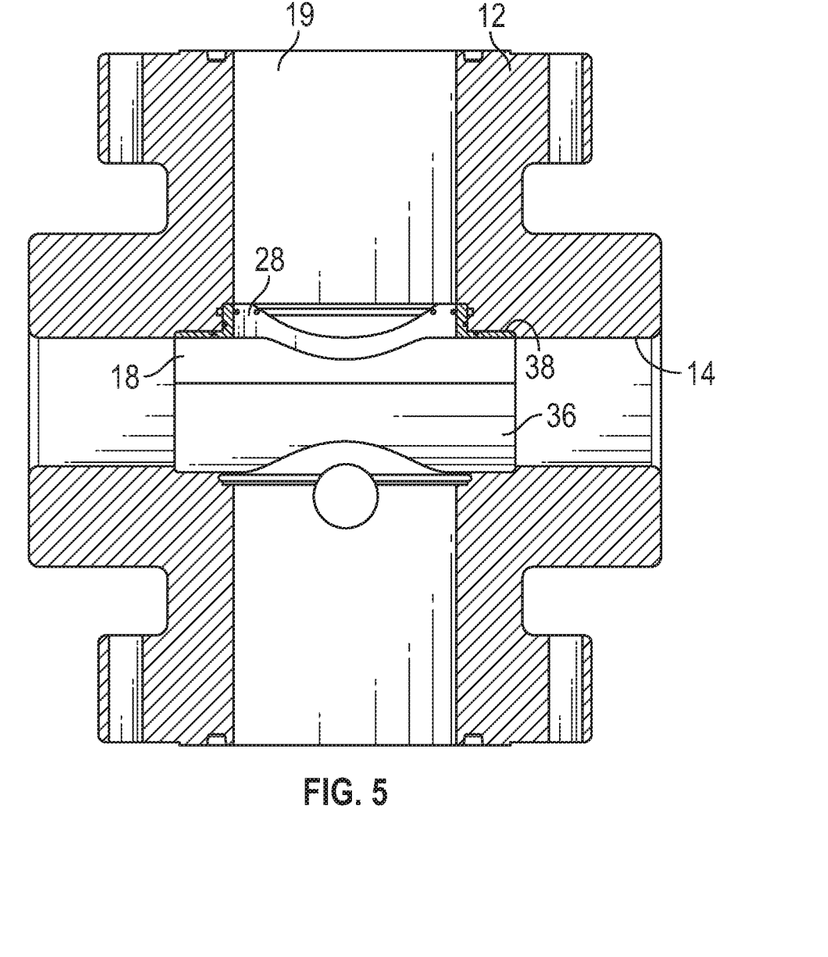
FIG. 5 is an elevational view showing the top insert positioned within a recess in the ram cavity and throughbore in accord with one embodiment of the invention.

FIG. 4 shows top insert 18 being introduced into BOP 12 via ram cavity 14 as indicated by the arrow. Once in position within the machined portion of the BOP shown in FIG. 5, top insert 18 is securely mounted. Referring to FIG. 5, the remainder of the replaceable seat seal assembly 10 is to be mounted in pocket 36 that is machined into the interior of BOP 12. Pocket 36, which is a recess, is formed within the original ram cavity 14 and throughbore 19.

In one non-limiting embodiment, the replacement seat seal assembly 10 comprises non-metallic material, rubber, elastomeric or fluoroelastomer material such as Viton 90 Dura. As discussed above, top insert 18 is molded as one piece in one embodiment with the O-rings as additions to the O-ring. It will be appreciated that the remaining side 20 and bottom inserts are 22 that form the interior surface of the replaceable portion 24 are also made of the same material. However, the invention is not limited to these materials and may be implemented in desired forms including but not limited to plastics, metal components, or other materials.

Figure 6:
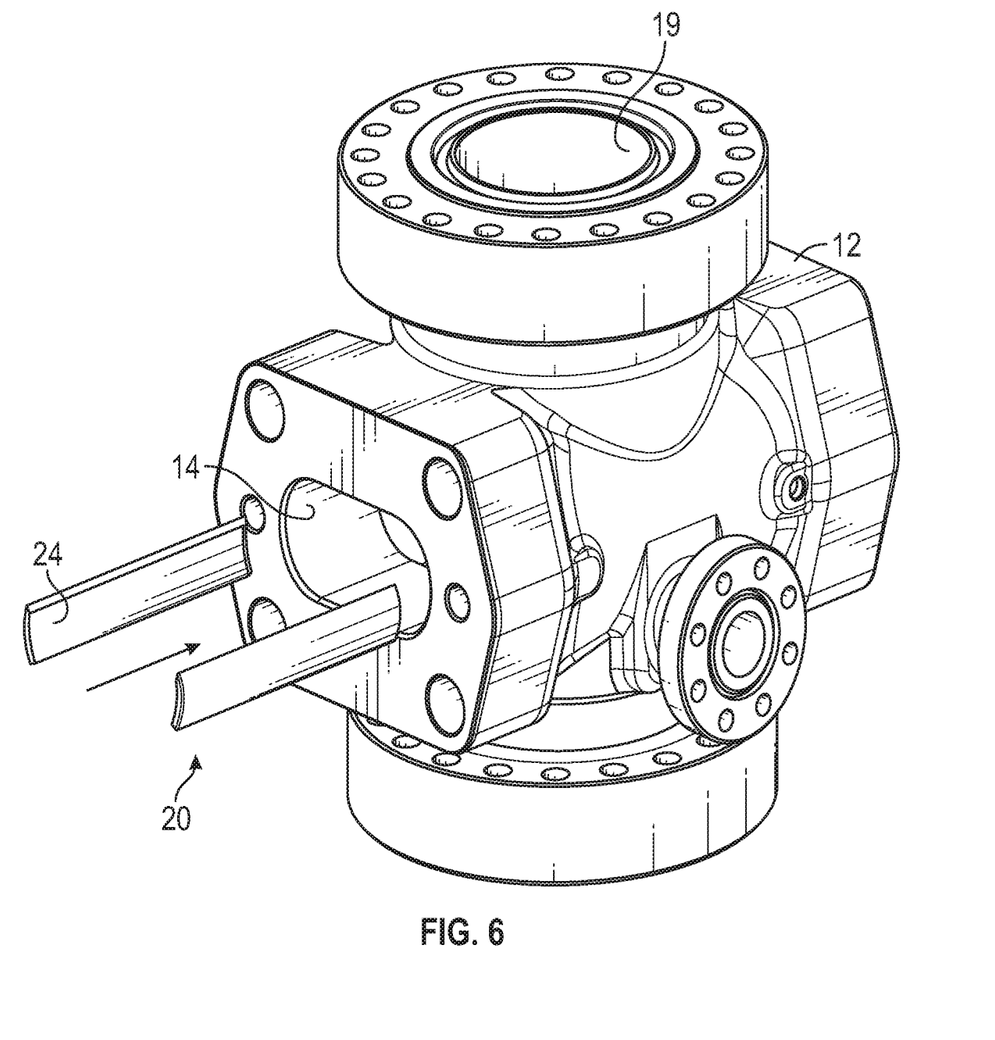
FIG. 6 is a perspective view showing two side inserts being introduced into the BOP in accord with one embodiment of the invention.

FIG. 6 shows side inserts 20 being introduced into BOP 12 via original ram cavity 14 as indicated by the arrow.

Figure 7:
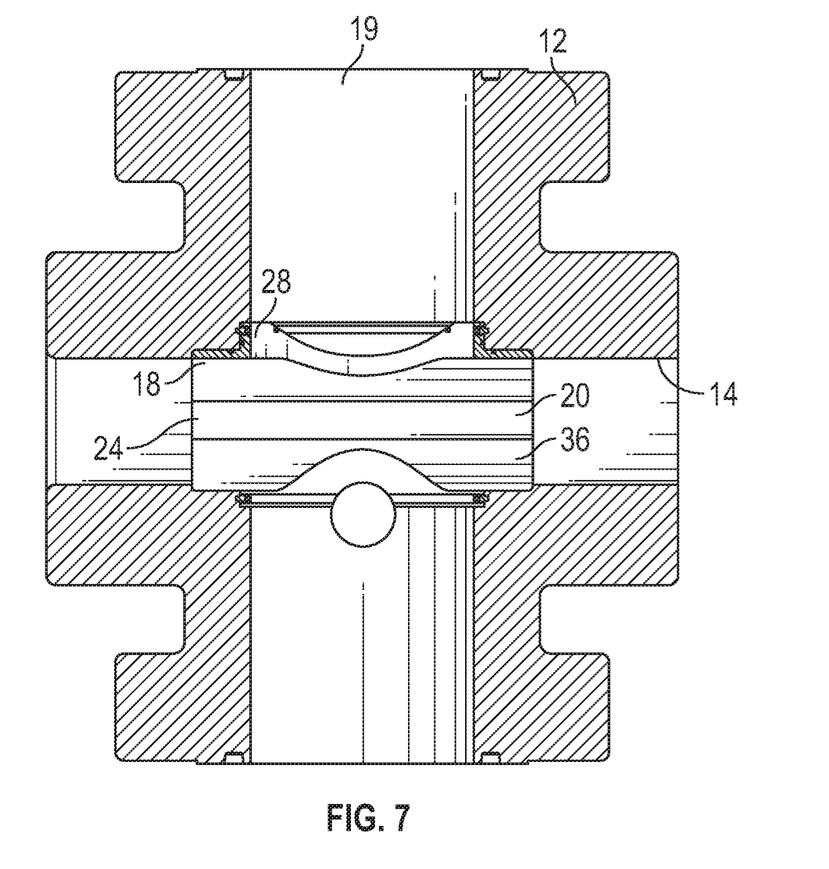
FIG. 7 is an elevational view in section showing a side insert positioned within the recess in accord with one embodiment of the invention.

FIG. 7 shows one of the side inserts 20 positioned into the dedicated position within machined pocket 36. The interior surface of side inserts 20 forms the sides of replaceable portion 24 of the ram cavity. As compared with FIG. 1, bottom insert 22 is removed showing pocket 36 machined within ram cavity 14.

Figure 8:
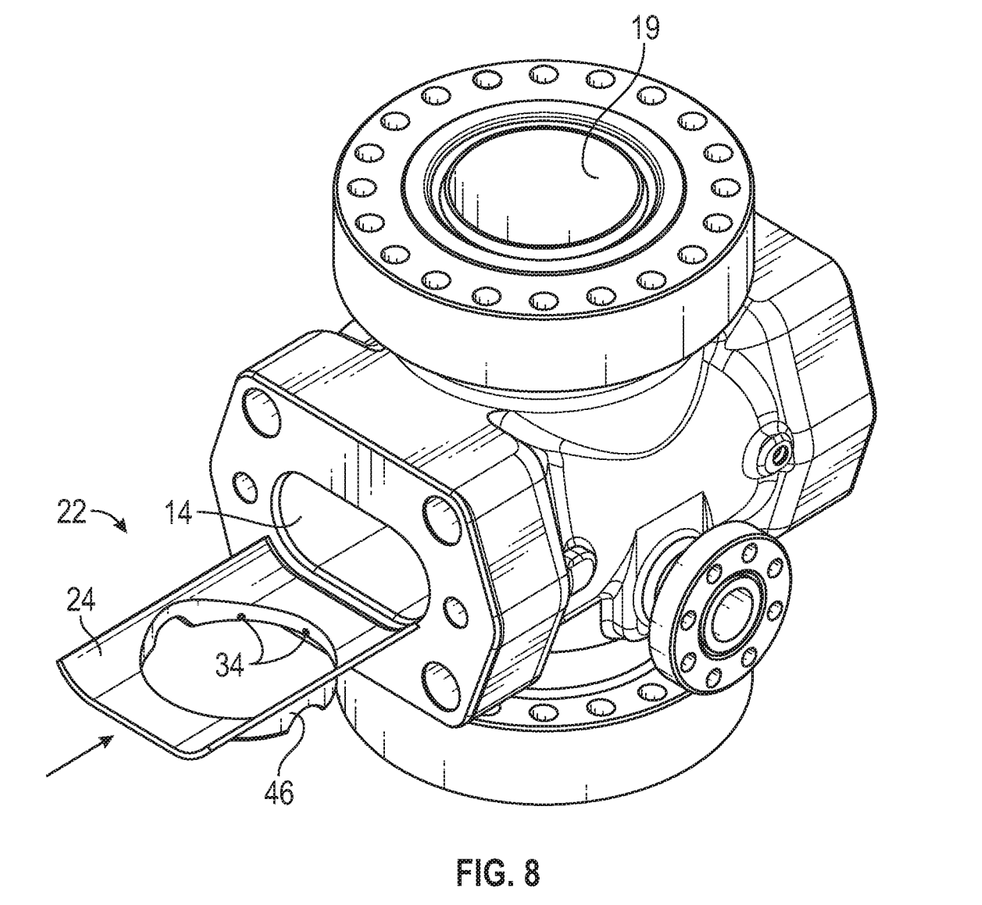
FIG. 8 is a perspective view showing a bottom insert being introduced into the BOP in accord with one embodiment of the invention.

FIG. 8 shows bottom insert 22 being introduced into original ram cavity 14 as indicated by the arrow. The interior surface of bottom insert 22 forms the bottom of replaceable portion 24 of the ram cavity into its dedicated position in pocket 36. Bottom insert 22 also has a bottom neck 46 that is mounted within throughbore 19. Bottom neck 46 may also be referred to as a second neck or the like in the claims.

Bottom insert 22 is very similar to top insert 18 except in one embodiment does not utilize the seal rings. However, if desired, seal rings could also be used in bottom insert 22.

Bottom insert 22 is also fastened into position utilizing fasteners 34 in bottom neck 46. FIG. 1 shows bottom insert 22 mounted within BOP 12. Inserts 18, 20, and 22 are the replaceable seat seals and may also be referred to herein as replaceable seat seal.

Figure 9:
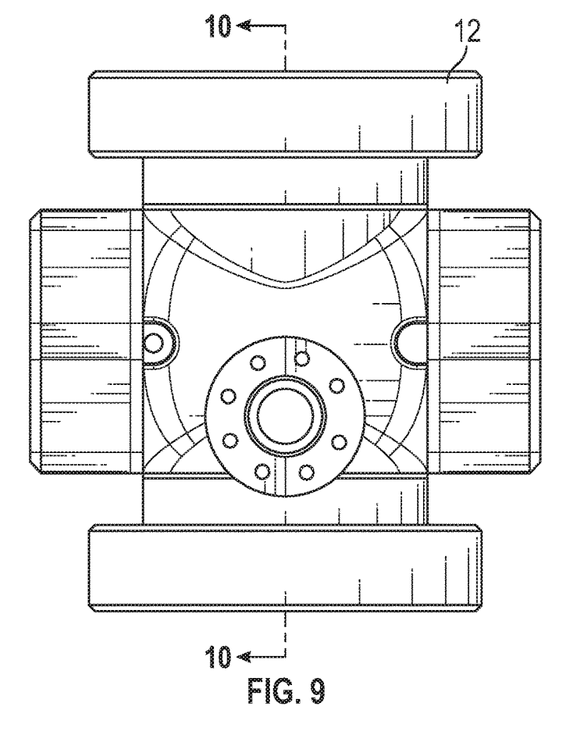
FIG. 9 is an elevational view of a BOP in accord with one embodiment of the invention.
Figure 10:
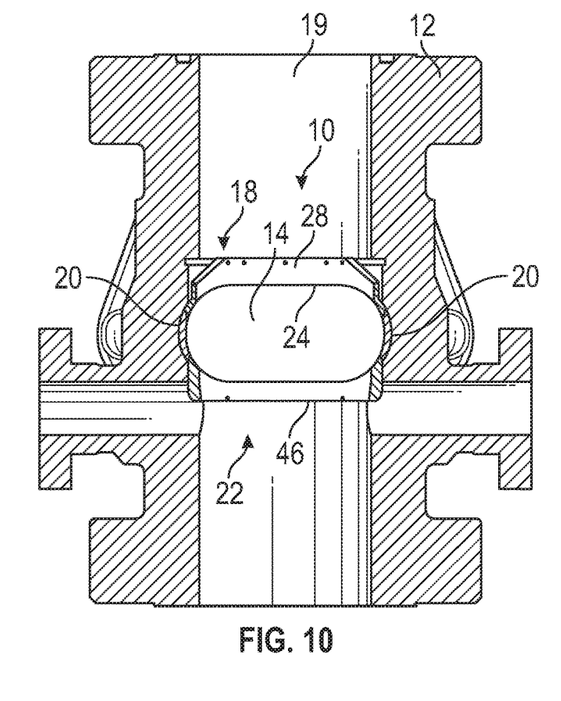
FIG. 10 is an elevational view in section taken along lines 10-10 of the BOP of FIG. 9 and looking through the ram cavity with the replaceable seat seal assembly installed in accord with one embodiment of the invention.

FIG. 10 is a sectional view of BOP 12 shown in FIG. 9 taken along line 10-10. Accordingly, this view shows the interior surface of inserted ram cavity 24 from another direction. Replaceable portion 24 of the ram cavity is formed on the interior surfaces of top insert 18, side inserts 20, and bottom insert 22. In combination, the inserts form a circumference of the replaceable portion 24 of the ram cavity from the sectional view looking through the inserted ram cavity and the remaining portion of the original ram cavity 14. It will be appreciated that the interior surface of replaceable portion 24 of the ram cavity could be described in terms of an upper surface, side surfaces, lower surface and the like. For example, the side surfaces could be referred to as additional surfaces or the like.

Figure 12:
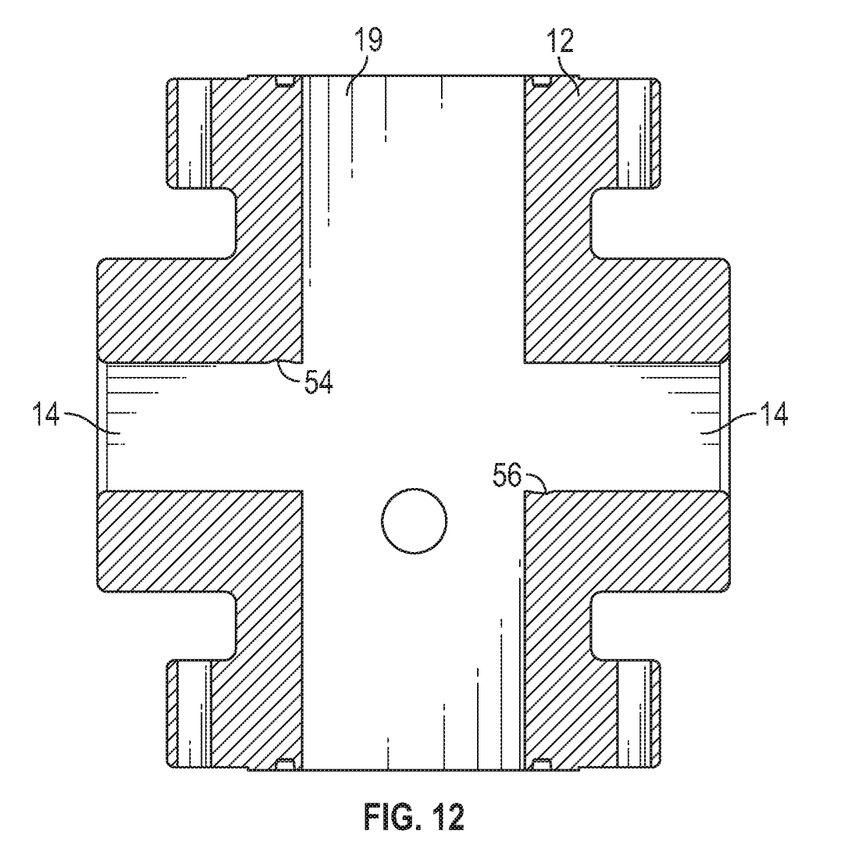
FIG. 12 is an elevational view in section showing damage to the ram cavity in accord with one embodiment of the present invention.

FIG. 12 shows rams with damage 54, 56 or worn portions in the original ram cavity 14 of the BOP 12. Damage or wear of various types causes the rams to lose the ability to suitably seal off the throughbore 19. Leakage occurs between ram cavity 14 and throughbore 19 behind the rams.

Figure 11:
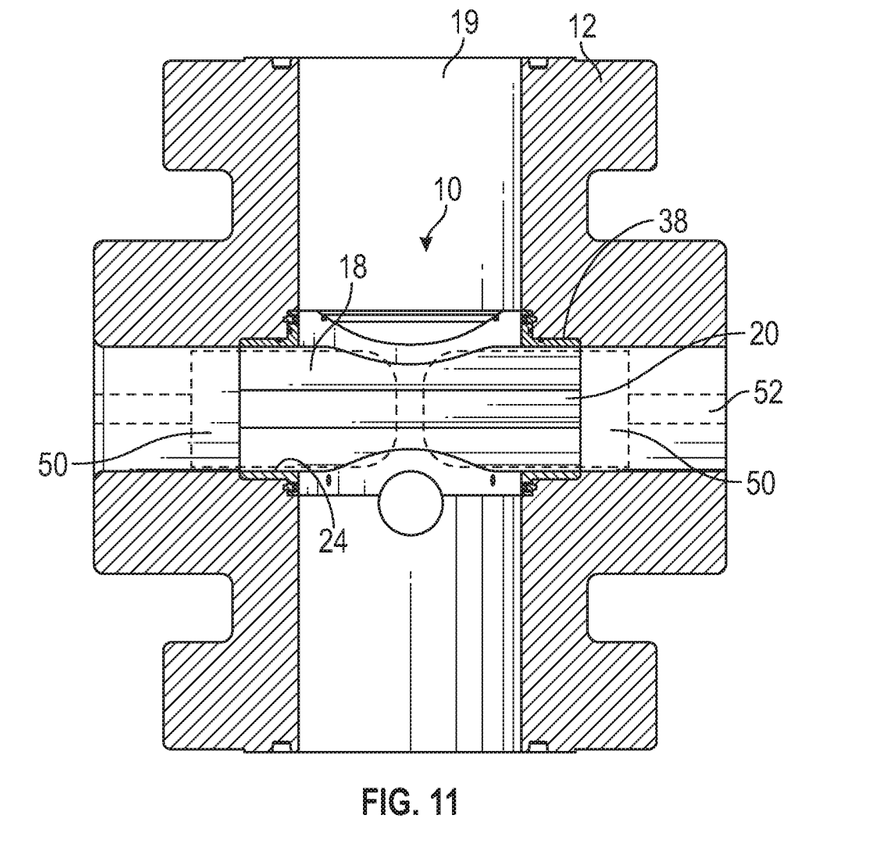
FIG. 11 is an elevational view in section showing the replaceable seal assembly installed with rams in dash mounted in accord with one embodiment of the present invention.

FIG. 11 shows rams in dash that are mounted within the replaceable seat seal assembly 10 in accord with the present invention. The damage is repaired so the rams are able to seal off throughbore 19. The O-rings 30 and 32 discussed with FIG. 2 and FIG. 3 prevent leakage between the top insert 18 and the BOP body. Referring to FIG. 1, the rams seal with the interior surface of the inserted ram cavity 24 created from replaceable seal seat assembly 10. The top insert 18 seals with pocket surface 38, which is the metallic machined surface of BOP 12. In other words, replaceable seal seat assembly 10 creates a new replaceable portion 24 of the ram cavity 14 that seals with the rams, which is referred to herein as an inserted ram cavity or replaceable portion 24 of the ram cavity.

It will also be appreciated that while the present invention can be used to repair BOPs, the present invention could also be utilized in new BOPs to provide an inserted ram cavity that allows for replacing the components thereof in the field without the need for extensive heat treatments to the BOP 12 body.

It will be appreciated that the descriptions of the top insert, bottom insert, and side inserts are described in the specification and claims in terms of the drawings that show the BOP oriented for operation with the throughbore vertical. The top insert, bottom insert, and so forth may also be referred to as first insert, second insert, and the like.

Referring again to FIG. 11, there is shown the replaceable seat seal assembly 10 with rams 50 and push rods 52 in dash that seal within the inserted ram cavity. The rams 50 used in replaceable portion 24 of the ram cavity are the same size and construction as would normally be utilized in the original ram cavity of a BOP that did not use the replaceable seal seats 10. Thus replaceable portion 24 of the ram cavity can be an exact replacement for the same BOP with a prior art ram cavity formed within BOP 12.

The rams 50 may be of many types that seal around pipes, that cut pipes, blind rams that seal a bore without pipes and so forth. The rams 50 in dash could represent any possible rams that are mounted within the inserts or inserted ram cavity 24.

Accordingly, the present invention provides a much less costly method for refurbishing a ram or for building a new ram. Once the replaceable seat seal assembly is installed, then future refurbishing of the ram cavity can be accomplished without extensive metal working and even may be accomplished at a work site or storage facility or the like.

Heretofore, the invention has been described in terms of four inserts, a top insert 18, bottom insert 22, and two side inserts 20, which are mounted within a pocket formed within an interior of the BOP. In another embodiment, some or perhaps all of the inserts could be combined depending on the BOP size and the flexibility of the inserts. The top inserts may include portions of the sides or the side inserts may be eliminated. As additional examples, the inserts may be combined so that three inserts may be utilized instead of four or perhaps two inserts rather than four. On the other hand, the inserts could be further broken down to include more than four inserts.

It will be appreciated that the descriptions of the top insert, bottom insert, and side inserts are described in the specification and claims in terms of the drawings that show the BOP oriented for operation with the throughbore vertical. The top insert, bottom insert, and so forth may also be referred to as first insert, second insert, and the like.

The foregoing description of the preferred embodiments of the invention has been presented for purposes of illustration and description only. It is not intended to be exhaustive or to limit the invention to the precise form disclosed; and obviously many modifications and variations are possible in light of the above teaching. Such modifications and variations that may be apparent to a person skilled in the art are intended to be included within the scope of this invention as defined by the accompanying claims.

The invention claimed is:

1. A replaceable seat seal assembly for a BOP comprising:
a BOP defining a throughbore and a ram cavity that intersects said throughbore;
at least one pocket defined within said throughbore and said ram cavity;
an insert that fits into said at least one pocket, said insert forms an upper surface of a replaceable portion of said ram cavity for said BOP when said BOP is oriented for operation; and
a neck of said insert that fits into said at least one pocket, said insert extending into said throughbore.

2. The replaceable seat seal assembly of claim 1, further comprising:
a second insert, said second insert forms a lower surface of said replaceable portion of said ram cavity; and a second neck for said second insert that extends into said throughbore; and
said at least one pocket receiving said second insert and said second neck.

3. The replaceable seat seal assembly of claim 2, further comprising two side inserts that form side surfaces of said replaceable portion of said ram cavity and fit between said first insert and said second insert.

4. The replaceable seat seal assembly of claim 3, further comprising fasteners that mount said neck of said insert in said throughbore.

5. The replaceable seat seal assembly of claim 4, wherein said neck comprises a seal ring, said insert further comprising a seal ring on an upper surface of said insert that seals with said ram cavity.

6. The replaceable seat seal assembly of claim 5, wherein said ram cavity comprises a worn portion and said at least one pocket is machined into said worn portion of said ram cavity and said throughbore.

7. The replaceable seat seal assembly of claim 6 wherein said insert and said second insert comprise a non-metallic material.

8. The replaceable seat seal assembly of claim 3, further comprising said insert, said second insert, and said side inserts are constructed as one unit to form an interior surface of said replaceable portion of said ram cavity.

9. The replaceable seat seal assembly of claim 2, further comprising said insert and said second insert form an interior surface of said replaceable portion of said ram cavity.

10. A replaceable seat seal assembly for a BOP comprising:
 a BOP defines a throughbore and ram cavity that intersects said throughbore;
 a first insert centrally positioned in said BOP around said throughbore that forms a first surface of a replaceable portion of said ram cavity for said BOP; and
 a second insert centrally positioned in said BOP around said throughbore that forms a second surface of said replaceable portion of said ram cavity.

11. The replaceable seat seal assembly of claim 10, further comprising two side inserts that form additional surfaces of said replaceable portion of said ram cavity and fit between said insert and said second insert.

12. The replaceable seat seal assembly of claim 11, further comprising a first neck for said insert that extends into said throughbore and a second neck for said second insert that extends into said throughbore.

13. The replaceable seat seal assembly of claim 12, wherein said first insert, said second insert, and said two side inserts form a circumference of said replaceable portion of said ram cavity.

14. The replaceable seat seal assembly of claim 13, wherein said BOP further comprises a pocket formed within said BOP to receive said insert, said second insert, said two side inserts, said neck, and said second neck.

15. The replaceable seat seal assembly of claim 14, wherein said ram cavity comprises a worn portion, said pocket being machined into said worn portion of said ram cavity and said throughbore.

16. A method for refurbishing a BOP, said BOP comprising a throughbore and an original ram cavity that intersects said throughbore, said original ram cavity being worn, said method comprising the steps of:
 machining one or more pockets within said throughbore and said original ram cavity; and
 inserting one or more replaceable seat seals into said one or more pockets to form a replaceable portion of said original ram cavity.

17. The method of claim 16, further comprising providing seal rings on said one or more replaceable seat seals.

18. The method of claim 16, further comprising inserting a first insert that forms an upper surface of said replaceable portion of said original ram cavity for said BOP when said BOP is oriented for operation.

19. The method of claim 18, further comprising inserting a second insert that forms a lower surface of said replaceable portion of said original ram cavity for said BOP when said BOP is oriented for operation.

20. The method of claim 19, further comprising inserting two side inserts that form side surfaces of said replaceable portion of said ram cavity and fit between said insert and said second insert.

21. A replaceable seat seal assembly for a BOP comprising:
 a BOP defining a throughbore and a ram cavity that intersects said throughbore;
 at least one pocket formed in an upper surface of said ram cavity surrounding said throughbore;
 a non-metallic insert that fits into said at least one pocket and forms an upper surface of a replaceable portion of said ram cavity for said BOP when said BOP is oriented for operation, said non-metallic insert on said upper surface surrounds said throughbore;
 a neck of said non-metallic insert that extends into said throughbore; and
 rams that slide with respect to said non-metallic insert to open and close said BOP.

22. The replaceable seat seal assembly of claim 21, further comprising:
 said at least one pocket also being defined within said throughbore, said neck fits into said at least one pocket within said throughbore.

23. The replaceable seat seal assembly of claim 21, further comprising:
 a fastener to secure said neck within said throughbore.

24. A replaceable seat seal assembly for a BOP comprising:
 a BOP defining a throughbore and a ram cavity that intersects said throughbore;
 at least one pocket formed in said throughbore;
 an insert that forms an upper surface of a replaceable portion of said ram cavity for said BOP when said BOP is oriented for operation, said insert on said upper surface surrounds said throughbore;
 a neck of said insert that extends into said at least one pocket formed in said throughbore; and
 rams that slide with respect to said insert to open and close said BOP.

25. The replaceable seat seal assembly of claim 24, further comprising:
 said at least one pocket also being defined within a metallic upper surface of said ram cavity, said insert fits into said at least one pocket within said metallic upper surface of said ram cavity.

26. The replaceable seat seal assembly of claim 24, further comprising:
 a fastener to secure said neck within said throughbore, said insert being comprised of a non-metallic material.

27. A method for refurbishing a BOP comprising a throughbore and an original ram cavity that intersects said throughbore, said original ram cavity being worn, said method comprising the steps of:
 machining one or more pockets within at least one of said throughbore and said original ram cavity; and
 inserting one or more replaceable seat seals into said one or more pockets to form a replaceable portion of said original ram cavity wherein movable rams seal with said one or more replaceable seat seals to prevent leakage caused by said original ram cavity being worn.

28. The method of claim 27 further comprising providing that said insert comprise non-metallic material.

29. A method for refurbishing a BOP comprising a throughbore and an original ram cavity that intersects said throughbore, said original ram cavity being worn, said method comprising the steps of:
 providing a non-metallic insert that forms an upper surface of a refurbished ram cavity for said BOP when said BOP is oriented for operation; and
 providing that rams in said BOP are moveable with respect to said non-metallic insert to open and close said throughbore wherein said rams seal with said non-metallic insert to prevent leakage caused by said original ram cavity being worn.

30. The method of claim 29, further comprising:
machining one or more pockets within at least one of said throughbore and said original ram cavity that receive said non-metallic insert.

* * * * *